(12) United States Patent  
Yamada et al.

(10) Patent No.: US 6,872,493 B2  
(45) Date of Patent: Mar. 29, 2005

(54) NONAQUEOUS ELECTROLYTIC SOLUTION AND NONAQUEOUS SECONDARY BATTERY

(75) Inventors: Manabu Yamada, Aichi (JP); Kyohei Usami, Aichi (JP); Naomi Awano, Aichi (JP); Naohiro Kubota, Tokyo (JP); Yasunori Takeuchi, Tokyo (JP)

(73) Assignees: Denso Corporation, Aichi (JP); Asahi Denka Kogyo Kabushiki Kaisha, Tokyo (JP)

( * ) Notice: Subject to any disclaimer, the term of this patent is extended or adjusted under 35 U.S.C. 154(b) by 546 days.

(21) Appl. No.: 09/984,574

(22) Filed: Oct. 30, 2001

(65) Prior Publication Data

US 2002/0076619 A1 Jun. 20, 2002

(30) Foreign Application Priority Data

Oct. 30, 2000 (JP) .......... 2000-331191  
Jan. 22, 2001 (JP) .......... 2001-12662  
Sep. 28, 2001 (JP) .......... 2001-301378

(51) Int. Cl.$^7$ ............... H04M 6/18  
(52) U.S. Cl. ............ 429/313; 429/317  
(58) Field of Search .......... 429/313, 317

(56) References Cited

U.S. PATENT DOCUMENTS 6,235,431 B1   5/2001   Takechi et al.  
6,447,952 B1 * 9/2002   Spiegel et al. ............ 429/218.1

FOREIGN PATENT DOCUMENTS

| JP | A 6-89741 | 3/1994 |
|---|---|---|
| JP | 8-171936 | 7/1996 |
| JP | A 8-195221 | 7/1996 |
| JP | A 9-171825 | 6/1997 |
| JP | A 9-306544 | 11/1997 |
| JP | 10-55822 | 2/1998 |
| JP | 10-69915 | 3/1998 |
| JP | 10-326611 | 12/1998 |

* cited by examiner

*Primary Examiner*—Bruce F. Bell  
(74) *Attorney, Agent, or Firm*—Young & Thompson (57) ABSTRACT

A nonaqueous electrolytic solution having an electrolyte salt dissolved in an organic solvent, which contains a silicon compound having an unsaturated bond which is represented by formula (I):

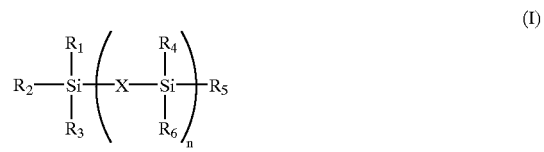

wherein $R_1$, $R_2$, $R_3$, $R_4$, $R_5$, and $R_6$ each represent an alkyl group, an alkoxy group, an alkenyl group, an alkenyloxy group, an alkynyl group, an alkynyloxy group, an aryl group or an aryloxy group, each of which may have an ether bond in the chain thereof; n represents a number of from 0 to 5; when n is 1 to 5, X represents a single bond, an oxygen atom, an alkylene group, an alkylenedioxy group, an alkenylene group, an alkenylenedioxy group, an alkynylene group, an alkynylenedioxy group, an arylene group or an arylenedioxy group; provided that at least one of $R_1$, $R_2$, $R_3$, $R_4$, $R_5$, $R_6$, and X represents a group containing an unsaturated bond, an organotin compound or an organogermanium compound and a nonaqueous secondary battery having the same.

18 Claims, 2 Drawing Sheets

NONAQUEOUS ELECTROLYTIC SOLUTION AND NONAQUEOUS SECONDARY BATTERY

FIELD OF THE INVENTION

This invention relates to a nonaqueous electrolytic solution comprising a silicon compound having an unsaturated bond, an organotin compound or an organogermanium compound and a nonaqueous secondary battery having the same. More particularly, it relates to a nonaqueous electrolytic solution containing a specific silicon compound, an organotin compound or an organogermanium compound which provides a nonaqueous secondary battery excellent in cycle characteristics and low-temperature characteristics. The nonaqueous secondary battery of the invention has a reduced rate of change in capacity or internal resistance against repetition of charges and discharges and a reduced increase in internal resistance in low temperature and is therefore capable of maintaining a high capacity.

BACKGROUND OF THE INVENTION

Nonaqueous secondary batteries have now enjoyed wide use as a power source of high voltage and high energy density with the recent spread of portable electronic equipment, such as notebook computers and handy video cameras. Nonaqueous secondary batteries have also found practical application to electric cars and hybrid cars which utilize electric power as part of driving power for considerations of environmental conservation.

However, nonaqueous secondary batteries suffer from a reduction in capacity and an increase in internal resistance in low temperature or as a result of repetition of charges and discharges. For this the reliability as a stable power source has been questioned.

Various additives have hitherto been proposed to improve the stability or electrical characteristics of nonaqueous secondary batteries. For example, JP-A-10-326611 makes a proposal to use tetramethyl silicate as an organic solvent for an electrolyte. The proposal brings about improved cycle characteristics but results in reduction of capacity. JP-A-10-55822 proposes an electrolytic solution which is made flame-retardant by using a silane compound, such as octyltriethoxysilane, as a flame-retardant organic solvent. The electrolytic solution proposed, while improving flame retardance, is not sufficiently satisfactory in electrical characteristics. U.S. Pat. No. 6,235,431 discloses an electrolytic solution containing an organosilicon compound having an Si—N bond, which prevents generation of a halogenic acid due to water penetration thereby preventing a battery from deterioration to some extent but is not sufficiently satisfactory in terms of electrical characteristics stability against charge and discharge cycles.

Further, JP-A-8-171936 teaches addition of an inorganic tin compound to a nonaqueous electrolytic solution of a lithium secondary battery, alleging that tin ions improve electrical characteristics. JP-A-10-69915 discloses addition of a stannic ester or a germanic ester to a nonaqueous electrolytic solution. These tin compounds or germanium compounds cannot be seen as sufficiently satisfactory in low-temperature battery characteristics.

SUMMARY OF THE INVENTION

An object of the present invention is to provide an electrolytic solution which is excellent in cycle characteristics and low-temperature characteristics such that a rate of change in capacity or internal resistance due to repetition of charges and discharges is reduced, and an increase in internal resistance in low temperature is reduced, so that a high capacity can be maintained.

Another object of the present invention is to provide a nonaqueous secondary battery having the electrolytic solution.

In the light of the above-mentioned circumstances, the present inventors have conducted extensive studies and found as a result that addition of a silicon compound having at least one unsaturated bond, an organotin compound or an organogermanium compound to an electrolytic solution provides a nonaqueous electrolytic solution excellent in cycle characteristics and low-temperature characteristics.

The present invention provides a nonaqueous electrolytic solution having an electrolyte salt dissolved in an organic solvent and a nonaqueous secondary battery having the same, the nonaqueous electrolytic solution containing a silicon compound represented by formula (I) shown below, an organotin compound or an organogermanium compound.

(I)

wherein $R_1$, $R_2$, $R_3$, $R_4$, $R_5$, and $R_6$ each represent an alkyl group, an alkoxy group, an alkenyl group, an alkenyloxy group, an alkynyl group, an alkynyloxy group, an aryl group or an aryloxy group, each of which may have an ether bond in the chain thereof; n represents a number of from 0 to 5; when n is 1 to 5, X represents a single bond, an oxygen atom, an alkylene group, an alkylenedioxy group, an alkenylene group, an alkenylenedioxy group, an alkynylene group, an alkynylenedioxy group, an arylene group or an arylenedioxy group; provided that at least one of $R_1$, $R_2$, $R_3$, $R_4$, $R_5$, $R_6$, and X represents a group containing an unsaturated bond.

DETAILED DESCRIPTION OF THE INVENTION

In the silicon compound having an unsaturated bond as represented by formula (I) the alkyl and the alkoxy groups represented by $R_1$, $R_2$, $R_3$, $R_4$, $R_5$ or $R_6$ include alkyl groups having 1 to 12 carbon atoms, such as methyl, ethyl, propyl, isopropyl, butyl, sec-butyl, t-butyl, pentyl, hexyl, heptyl, octyl, isooctyl, 2-ethylhexyl, nonyl, decyl, undecyl, and dodecyl; and alkoxy groups derived from these alkyl groups. The alkenyl and the alkenyloxy groups include alkenyl groups having 2 to 8 carbon atoms, such as vinyl, allyl, 1-propenyl, isopropenyl, 2-butenyl, 1,3-butadienyl, 2-pentenyl, and 2-octenyl; and alkenyloxy groups derived therefrom. The alkynyl and alkynyloxy groups include alkynyl groups having 2 to 8 carbon atoms, such as ethynyl, 2-propynyl, and 1,1-dimethyl-2-propynyl; and alkynyloxy groups derived therefrom. The aryl and the aryloxy groups include aryl groups having 6 to 12 carbon atoms, such as phenyl, tolyl, xylyl, and t-butylphenyl; and aryloxy groups derived therefrom.

In formula (I), the alkylene and the alkylenedioxy groups as represented by X include alkylene groups having 1 to 8 carbon atoms, such as methylene, ethylene, trimethylene, 2,2-dimethyltrimethylene, tetramethylene, pentamethylene, and hexamethylene; and alkylenedioxy groups derived from these alkylene groups. The alkenylene and the alkenylenedioxy groups include alkenylene groups having 2 to 8 carbon atoms, such as vinylene, propenylene, isopropenylene, butenylene, and pentenylene; and alkenylenedioxy groups derived therefrom. The alkynylene and the alkynylenedioxy groups include alkynylene groups having 2 to 8 carbon atoms, such as ethynylene, propynylene, butynylene, pentynylene, and 1,1,4,4-tetramethylbutynylene; and alkynylenedioxy groups derived therefrom. The arylene and the arylenedioxy groups include arylene groups having 6 to 12 carbon atoms, such as phenylene, methylphenylene, dimethylphenylene, and t-butylphenylene; and arylenedioxy groups derived therefrom.

The unsaturated bond-containing silicon compounds represented by formula (I) specifically include, but are not limited to, the following compound Nos. 1 through 26.

Compound No. 1

Compound No. 2

Compound No. 3

Compound No. 4

Compound No. 5

Compound No. 6

Compound No. 7

Compound No. 8

Compound No. 9

Compound No. 10

Compound No. 11

Compound No. 12

Compound No. 13

The above-recited unsaturated bond-containing silicon compounds are known, and the process for preparing them is not limited particularly. For example, compound No. 1 is obtained by dehydrogenating coupling reaction between a hydrogen-containing silicon compound and a hydroxyl-containing silicon compound.

The silicon compound according to the present invention is ready to self-polymerize. It is considered that the silicon compound self-polymer electrode interface in the initial stage of charge-discharge cycles to form a stable film thereby to suppress an increase of interfacial resistance with cycles. To manifest this effect, the silicon compound is preferably present in an electrolytic solution in an amount of 0.05 to 5% by volume, particularly 0.1 to 3% by volume. An amount less than 0.05 vol % fails to produce a substantial effect. Amounts exceeding 5 vol % not only result in bad economy, bringing no further enhancement of the effect, but tend to adversely affect the characteristics of the electrolytic solution.

The organotin compound or the organogermanium compound which can be used in the present invention preferably includes those represented by formula (II):

(II)

wherein Me represents a tin atom or a germanium atom; $R_1$ represents an alkyl group, an alkenyl group, an aryl group or an alkoxycarbonylalkyl group; when m is 1, $X_1$ and $X_2$ each represent or $X_2$ is nil; when m is 2, $X_2$ represents an alkylene group, an alkenylene group, an alkynylene group, —$Z_3$—, or —$Z_1$—$R_3$—$Z_2$—; $Z_1$ and $Z_2$ each represent an oxygen atom, a sulfur atom or —COO—; $Z_3$ represents an oxygen atom or a sulfur atom; $R_2$ represents a substituted or unsubstituted alkyl group, a substituted or unsubstituted alkenyl group or a substituted or unsubstituted aryl group; $R_3$ represents a substituted or unsubstituted straight-chain or branched alkylene group, a substituted or unsubstituted straight-chain or branched alkenylene group or a substituted or unsubstituted arylene group; $R_4$ represents an alkyl group or an aryl group; $R_5$ represents a hydrogen atom, an alkyl group or $R_4$CO—; $R_6$ represents an alkyl group, an aryl group or —O—$R_2$; l represents 1 to 4; m represents 1 or 2; n represents 0 or 1; p represents 0 or 1; q represents 0 or 1; and r represents 0 or 1; provided that when $X_2$ is present, 1+2p+2n+q equals 3, and when $X_2$ is absent, 1+2p+2n+q equals 4.

In formula (II), the alkyl group as represented by $R_1$, $R_2$, $R_4$, $R_5$ and $R_6$ includes methyl, ethyl, propyl, butyl, amyl, hexyl, octyl, nonyl, decyl, undecyl, dodecyl, tridecyl, tetradecyl, pentadecyl, hexadecyl, heptadecyl, octadecyl, cyclopentylcyclohexyl, cycloheptyl, cyclooctyl, and benzyl.

The alkenyl group as $R_1$ and $R_2$ includes vinyl, propenyl, hexenyl, dodecenyl, hexadecenyl, and octadecenyl.

The aryl group as $R_1$, $R_2$, $R_4$, and $R_6$ includes phenyl, naphthyl, tolyl, butylphenyl, hexylphenyl, octylphenyl, nonylphenyl, and dodecylphenyl. The alkylene group as $R_3$ or $X_2$ includes ethylene, 1,2-propylene, 1,3-propylene, 1,2-butylene, and 1,4-butylene. The alkoxycarbonylalkyl group as $R_1$ includes methoxycarbonylethyl, isopropoxycarbonylethyl, butoxycarbonylethyl, and octoxycarbonylethyl.

The alkylene group as represented by $R_3$ or $X_2$ includes ethylene, propylene, trimethylene, and tetramethylene. The alkenylene group as $R_3$ or $X_2$ includes vinylene, propenylene, butenylene, hexenylene, dodecenylene, hexadecenylene, and octadecenylene. The alkynylene group as $X_2$ includes ethynylene and 2-propynylene. The arylene group as $R_3$ includes phenylene, naphthylene, tolylene, butylphenylene, hexylphenylene, octylphenylene, nonylphenylene, and dodecylphenylene.

The substituent of the substituted groups represented by $R_2$ or $R_3$ includes a halogen atom, an alkoxy group, an alkanoyloxy group, and an alkylmercapto group. The halogen atom includes chlorine, fluorine, and bromine. The other substituents include those derived from the above-enumerated alkyl groups.

The organotin compound represented by formula (II) includes (1) an organotin alkoxide, (2) a (β-diketonato) organotin, (3) an organotin oxide and/or sulfide, (4) an organotin mercaptide or mercaptide alkoxide, (5) an organotin mercaptocarboxylate, (6) an organotin carboxylate, (7) an organotin sulfonate, and (8) a tetraorganotin. Specific but non-limiting examples of these organotin compounds are described below.

(1) The organotin alkoxide includes monohydric alcoholic alkoxides of organic tin, such as monobutyltin trimethoxide, monooctyltin trimethoxide, dibutyltin dimethoxide [$(C_4H_9)_2$Sn(—OCH$_3$)$_2$], dibutyltin dibutoxide [$(C_4H_9)_2$Sn(—O(CH$_2$)$_3$)$_2$], divinyltin dibutoxide, dibutyltin dipropoxide, and dibutyltin bis(methoxyethoxide); and organotin glycolates, such as dibutyltin ethylene glycolate [$(C_4H_9)_2$Sn(—O—CH$_2$CH$_2$—O—)], dibutyltin(1-methyl)ethylene glycolate, divinyltin ethylene glycolate, diallyltin ethylene glycolate, dibutyltin(1-hexyl)ethylene glycolate, divinyltin(1-hexyl) ethylene glycolate, dibutyltin(1-vinyloxymethyl)ethylene glycolate, dibutyltin(1-allyloxymethyl)ethylene glycolate [$(C_4H_9)_2$Sn(—O—CH(CH$_2$OCH$_2$CH=CH$_2$)CH$_2$—O—)], dibutyltin (1-butoxymethyl)ethylene glycolate, dibutyltin(1-acetoxymethyl)ethylene glycolate, dibutyltin(2,2-dimethyl)-1,3-propylene glycolate, dibutyltin(1,1,3-trimethyl)-1,3-propylene glycolate, dibutyltin(2-ethyl-2-butyl)-1,3-propylene glycolate, dibutyltin (2,2-difluoro)-1,3-propylene glycolate, and dibutyltin(2-butenylene)-1,4-glycolate.

(2) The (β-diketonato)organotin includes (alkane-β-dionato)organotins, such as bisacetylacetonatodibutyltin represented by formula:

bis(hexafluoroacetylacetonato)dibutyltin, bis(2,2,6,6-tetramethyl-3,5-heptanedionato)-dibutyltin, and bis(2,2-dimethyl-3,5-hexanedionato)dibutyltin; and aromatic (β-diketonato)organotins, such as bisbenzoylacetonatodibutyltin and bisdibenzoyl-methanatodibutyltin.

(3) The organotin oxide and/or sulfide includes monobutyltin oxide [$(C_4H_9$Sn(=O))$_2$—O], monobutyltin sulfide [$(C_4H_9$Sn(=S))$_2$—S], dimethyltin oxide [$(CH_3)_2$Sn=O], dibutyltin oxide, dioctyltin oxide, dimethyltin sulfide [$(CH_3)_2$Sn=S], dibutyltin sulfide, dioctyltin sulfide, and monobutyltin oxide sulfide.

(4) The organotin mercaptide or mercaptide alkoxide includes monobutyltin trioctylmercaptide, dimethyltin didodecylmercaptide [$(CH_3)_2$Sn—((CH$_2$)$_{11}$CH$_3$)$_2$], dibutyltin didodecylmercaptide, dibutyltin 1,2-ethanedithiolate, and dibutyltin O,S-monothioethylene glycolate.

(5) The organotin mercaptocarboxylate includes monomethyltin S,S,S-tris(isooctyl thioglycollate) [CH$_3$Sn(SCH$_2$COOC$_8$H$_{17}$-i)$_3$], monobutyltin S,S,S-tris(isooctyl thioglycollate), monooctyltin S,S,S-tris(isooctyl thioglycollate), dimethyltin S,S-bis(isooctyl thioglycollate), dibutyltin S,S-bis(isooctyl thioglycollate), dioctyltin S,S-bis (isooctyl thioglycollate), dibutyltin S,S-bis(butyl 3-mercaptopropionate) [(C$_4$H$_9$)$_2$Sn(SCH$_2$CH$_2$COOC$_4$H$_9$)$_2$], dimethyltin S,S-bis(mercaptoethyl oleate) [[(CH$_3$)$_2$Sn (SCH$_2$CH$_2$O—CO—C$_{17}$H$_{35}$)$_2$], dimethyltin S,S-bis (mercaptoethyl acetate), dibutyltin O,S-thioglycollate [(C$_4$H$_9$)$_2$Sn(—SCH$_2$COO—)], divinyltin O,S-thioglycollate, dibutyltin O,S-3-mercaptopropionate [(C$_4$H$_9$)$_2$Sn(—SCH$_2$CH$_2$COO—)], bis(dibutyltin S-isooctyl thioglycollate)sulfide [S(Sn(C$_4$H$_9$)$_2$—SCH$_2$COOC$_8$H$_{17}$-i)$_2$], and bis(dibutyltin S-methylthio glycolate) O,S-thioglycollate [(—SCH$_2$COO—)(Sn(C$_4$H$_9$)$_2$—SCH$_2$COOCH$_3$)$_2$].

(6) The organotin carboxylate includes tributyltin acrylate [(C$_4$H$_9$)$_3$Sn—O—CO—CH=CH$_2$], dibutyltin dibenzoate [(C$_4$H$_9$)$_2$Sn(—O—CO—C$_6$H$_5$)$_2$], dimethyltin bis (neodecanoate) [(CH$_3$)$_2$Sn(—O—CO—C(CH$_3$)$_2$C$_6$H$_{13}$)$_2$], monobutyltin tris(2-ethylhexanoate) [C$_4$H$_9$Sn(—O—CO—CH(C$_2$H$_5$)C$_4$H$_9$)$_3$], dibutyltin bis(monomethyl maleate [(C$_4$H$_9$)$_2$Sn(OCOCH=CHCOOCH$_3$)], dibutyltin diacetate [(C$_4$H$_9$)$_2$Sn(—OCOCH$_3$)$_2$], divinyltin diacetate, dibutyltin didodecanoate [(C$_4$H$_9$)$_2$Sn(—OCO(CH$_2$)$_{10}$CH$_3$)$_2$], dibutyltin diacrylate [(C$_4$H$_9$)$_2$Sn(—OCOCH=CH$_2$)$_2$], dibutyltin dimethacrylate [(C$_4$H$_9$)$_2$Sn(—OCOCCH$_3$=CH$_2$)$_2$], triphenyltin acrylate, and bis(dibutyltin acetate)oxide [((C$_4$H$_9$)$_2$Sn(OCOCH$_3$))$_2$—O].

(7) The organotin sulfonate includes dibutyltin bis (benzenesulfonate) and dibutyltin bis (trifluoromethanesulfonate).

(8) The tetraorganotin includes tetrabutyltin, trimethylallyltin [(CH$_3$)$_3$Sn—(CH$_2$CH=CH$_2$)], tributylallyltin [(C$_4$H$_9$)$_3$Sn—(CH$_2$CH=CH$_2$)], dibutylvinyltin [(C$_4$H$_9$)$_2$Sn—(CH=CH$_2$)$_2$], triphenylallyltin, and bis(tributyltin) acetylene.

These organotin compounds are known, and the process for preparing them is not particularly limited. For example, a reaction between SnCl$_4$ and a Grignard reagent or a trialkylaluminum gives a tetraalkyltin. A tetraalkyltin is cleaved with a halogen, a hydrogen halide or SnCl$_4$ to give an organotin halide. Hydrolysis of the organotin halide with an alkali (e.g., sodium hydroxide) provides an organotin oxide, which is lead to various derivatives by ligand displacement reaction with an alcohol, a β-diketone compound, an organic acid, a mercaptan compound, etc.

Of these organotin compounds mono-organic tin compounds and di-organic tin compounds are known to have extremely low toxicity. Besides, they are easy to synthesize and have stability and are therefore preferred.

Of the organotin compounds the organotin alkoxides (1), particularly organotin glycolates which may be substituted with an alkyl group, an alkoxymethyl group or an alkenyloxymethyl group, and the (β-diketonato)organotins (2), particularly (alkanedionato)organotins, are highly soluble in nonaqueous solvents and greatly effective in improving low-temperature characteristics of nonaqueous secondary batteries.

The organogermanium compound represented by formula (II) includes allyltriethylgermane, allyltrimethylgermane, cyclopentadienyltrimethylgermane, vinyltriethylgermane, tetraethylgermane, hexaallyldigermanoxane, tetraallylgermane, dibutylgermanium(1-allyloxymethyl) ethylene glycolate, monooctylgermanium trimethoxide, dibutylgermanium dipropoxide, dibutylgermanium(1-hexyl) ethylene glycolate, dibutylgermanium(1,1,3-trimethyl)-1,3-propylene glycolate, bisacetylacetonatodibutylgermanium, bis(2,2-dimethyl-3,5-hexanedionato)dibutylgermanium, and bisbenzoylacetonatodibutylgermanium.

The mechanism of the organotin or organogermanium compound's manifesting the effect has not been elucidated. It is considered that the organotin compound self-polymerizes or reacts on the electrode interface in the initial stage of charge-discharge cycles to form a film that retains high lithium ion conductivity even in low temperature. To draw this effect, the organotin compound or the organogermanium compound is preferably present in an electrolytic solution in an amount of 0.05 to 5% by weight, particularly 0.1 to 3% by weight. In an amount less than 0.05 wt %, the effect is insubstantial. Amounts exceeding 5 wt % not only result in bad economy, bringing no further enhancement of the effect, but tend to adversely affect the characteristics of the electrolytic solution.

The silicon compound, the organotin compound or the organogermanium compound is added to a nonaqueous solvent or a combination of two or more nonaqueous solvents generally used in nonaqueous electrolytic solutions. Particularly preferred nonaqueous solvents are combinations of acyclic carbonates and cyclic carbonates. Use of these combinations provides electrolytic solutions having not only excellent cycle characteristics but good balance between solution viscosity and the capacity, output, etc. of resulting batteries.

The nonaqueous solvents that can be used in the nonaqueous electrolytic solution of the present invention include, but are not limited to, the following compounds.

Cyclic carbonate compounds, cyclic ester compounds, sulfone or sulfoxide compounds, and amide compounds have a high specific dielectric constant and serve to raise the dielectric constant of an electrolytic solution. Suitable cyclic carbonate compounds include ethylene carbonate (EC), propylene carbonate (PC), vinylene carbonate, and butylene carbonate. Suitable cyclic ester compounds include γ-butyrolactone and γ-valerolactone. Suitable sulfone or sulfoxide compounds include sulfolane, sulfolene, tetramethylsulfolane, diphenylsulfone, dimethylsulfone, and dimethyl sulfoxide. Examples of suitable amide compounds are N-methylpyrrolidone, dimethylformamide, and dimethylacetamide.

Acyclic carbonate compounds, acyclic or cyclic ether compounds, and acyclic ester compounds reduce the viscosity of an electrolytic solution. Reduction in solution viscosity leads to improvement in battery characteristics, such as power density, owing to improved electrolyte ion mobility and the like. With a reduced viscosity, an electrolytic solution will have improved low-temperature performance. Examples of the acyclic carbonate compounds are dimethyl carbonate (DMC), ethylmethyl carbonate (EMC), diethyl carbonate (DEC), ethyl-n-butyl carbonate, methyl-t-butyl carbonate, di-isopropyl carbonate, and t-butyl-isopropyl carbonate. The acyclic or cyclic ether compounds include dimethoxyethane (DME), ethoxymethoxyethane, diethoxyethane, tetrahydrofuran, dioxolane, and dioxane.

The acyclic ester compounds include carboxylic ester compounds represented by formula (III):

(III)

wherein R represents an alkyl group having 1 to 4 carbon atoms; and n represents 0, 1 or 2.

The alkyl group as R in formula (III) includes methyl, ethyl, propyl, isopropyl, butyl, sec-butyl, and t-butyl. Specific examples of the compounds of formula (III) are methyl formate, ethyl formate, methyl acetate, ethyl acetate, propyl acetate, sec-butyl acetate, butyl acetate, methyl propionate, and ethyl propionate. The carboxylic ester compounds of formula (III) have a low solidifying point and, when combined with the cyclic or acyclic carbonate compound, are effective in improving low-temperature battery characteristics. A preferred amount of the carboxylic ester compound to be used is 1 to 50% by volume based on the total nonaqueous solvent. Acetonitrile, propionitrile, nitromethane, and derivatives thereof are also useful.

The acyclic carbonate compounds additionally include alkylene biscarbonate compounds represented by formula (IV):

(IV)

wherein $R_9$ and $R_{11}$ each represent an alkyl group having 1 to 4 carbon atoms; and $R_{10}$ represents a straight-chain or branched alkylene group having 1 to 5 carbon atoms.

The compounds of formula (IV) reduce volatility of an electrolytic solution. Also, having excellent storage stability in high temperature, they bring about improvement in high-temperature battery characteristics.

In formula (IV), the alkyl group as $R_9$ and $R_{11}$ includes methyl, ethyl, propyl and butyl, and the alkylene group as $R_{10}$ includes ethylene, propylene, and dimethylpropylene. The compound of formula (IV) includes 1,2-bis(methoxycarbonyloxy)ethane, 1,2-bis(ethoxycarbonyloxy)ethane, and 1,2-bis(ethoxycarbonyloxy)propane.

The acyclic ether compounds include glycol diether compounds represented by formula (V):

(V)

wherein $R_{12}$ and $R_{14}$ each represent a halogen-substituted or unsubstituted alkyl group having 1 to 8 carbon atoms; $R_{13}$ represents a halogen-substituted or unsubstituted straight-chain or branched alkylene group having 1 to 4 carbon atoms; and n2 represents a number of from 1 to 4; provided that at least one of $R_{12}$, $R_{13}$, and $R_{14}$ is a halogen-substituted group.

Having at least one fluorine-substituted end group, the compound of formula (V) exerts surfactant-like action on the electrode interface, increasing affinity of a nonaqueous electrolytic solution to electrodes, reducing the initial internal resistance of a battery, and enhancing the mobility of lithium ions.

In formula (V), the alkyl group as represented by $R_{12}$ and $R_{14}$ includes methyl, trifluoromethyl, ethyl, trifluoroethyl, propyl, pentafluoropropyl, isopropyl, butyl, pentyl, hexyl, heptyl, and octyl. The alkylene group as represented by $R_{13}$ includes ethylene, propylene, difluoropropylene, and butylene. Specific examples of the compounds represented by formula (V) are ethylene glycol bis(trifluoroethyl)ether, isopropylene glycol bis(trifluoroethyl)ether, ethylene glycol bis(trifluoromethyl)ether, and diethylene glycol bis(trifluoroethyl)ether.

A halogen type, a phosphorus type or other flame retardant can appropriately be added to the electrolytic solution of the present invention to make the solution flame retardant.

The phosphorus type flame retardant which can preferably be used in the invention includes one or more of phosphoric ester compounds represented by formula (VI), (VII) or (VIII):

(VI)

(VII)

(VIII)

wherein $R_{15}$, $R_{16}$, $R_{17}$, and $R_{19}$ each represent an alkyl group, an alkenyl group, an alkynyl group, an alkyl group having an ether bond or a halogen-substituted alkyl group, each containing 1 to 8 carbon atoms; $R_{18}$ represents an alkylene group, an alkenylene group, an alkynylene group, an alkylene group having an ether bond or a halogen-substituted alkylene group, each containing 1 to 4 carbon atoms; and $R_{20}$ represents a trihydric alcohol residue having 3 to 18 carbon atoms.

In formulae (VI) and (VII), the alkyl group as $R_{15}$, $R_{16}$, $R_{17}$ and $R_{19}$ includes methyl, ethyl, propyl, butyl, pentyl, and hexyl. The halogen-substituted alkyl group includes 2-fluoroethyl and 2,2,2-trifluoroethyl.

In formula (VII), the alkylene group as $R_{18}$ includes ethylene, propylene, trimethylene, and 2,2-dimethyltrimethylene. The alkenylene group includes vinylene and butenylene. The alkynylene group includes ethynylene, propynylene, 2-butynylene, 1,1,4,4-tetramethyl-2-butynylene, 1,4-dimethyl-1,4-diethyl-2-butynylene, and 1,4-dimethyl-1,4-diisobutyl-2-butynylene.

In formula (VIII), the trihydric alcohol residue having 3 to 18 carbon atoms as represented by $R_{20}$ includes those derived from glycerol, trimethylolethane, trimethylolpropane, and 1,2,4-trihydroxybutane.

The compounds of formulae (VI) to (VIII) specifically include, but are not limited to, the following compound Nos. 27 to 35.

Compound No. 27

Compound No. 28

Compound No. 29

Compound No. 30

Compound No. 31

Compound No. 32

Compound No. 33

Compound No. 34

Compound No. 35

The phosphorus compounds of formulae (VI) to (VIII) are preferably used in an amount of 5 to 100% by weight, particularly 10 to 50% by weight, based on the total organic solvent of the electrolytic solution. An amount less than 5 wt % fails to produce sufficient flame retardant effect.

The processes of synthesizing the compounds of formulae (VI) to (VIII) are not particularly restricted. For example, they can be prepared with ease by the reaction between phosphorous oxychloride and a corresponding alcohol.

Electrolytes which can be used in the present invention are conventional and include, for example, $LiPF_6$, $LiBF_4$, $LiAsF_6$, $LiCF_3SO_3$, $LiN(CF_3SO_2)_2$, $LiC(CF_3SO_2)_3$, $LiSbF_6$, $LiSiF_5$, $LiAlF_4$, $LiSCN$, $LiClO_4$, $LiCl$, $LiF$, $LiBr$, $LiI$, $LiAlF_4$, $LiAlCl_4$, $NaClO_4$, $NaBF_4$, and $NaI$. Preferred of them for excellent electrical characteristics are inorganic salts, such as $LiPF_6$, $LiBF_4$, $LiClO_4$, and $LiAsF_6$, and organic salts, such as $CF_3SO_3Li$, $N(CF_3SO_2)_2Li$, and $C(CF_3SO_2)_3Li$. They can be used either individually or as a combination of two or more thereof.

The electrolyte is preferably used in a concentration of 0.1 to 3.0 mol, particularly 0.5 to 2.0 mol, per liter of the above-described nonaqueous solvent (organic solvent). An electrolyte concentration less than 0.1 mol/l tends to result in a failure to obtain a sufficient current density. A concentration more than 3.0 mol/l tends to impair stability of the electrolytic solution.

The nonaqueous electrolytic solution according to the present invention is suitably applicable to primary or secondary batteries, especially nonaqueous secondary batteries hereinafter described.

The nonaqueous secondary battery according to the present invention comprises a cathode and an anode. The cathode is a sheet electrode prepared by applying a slurried mixture of a cathode active material, a binder, and an electrically conductive agent onto a current collector followed by drying. Useful cathode active material includes $TiS_2$, $TiS_3$, $MoS_3$, $FeS_2$, $Li_{(1-x)}MnO_2$, $Li_{(1-x)}Mn_2O_4$, $Li_{(1-x)}CoO_2$, $Li_{(1-x)}NiO_2$, $LiV_2O_3$, and $V_2O_5$, wherein x represents a number of from 0 to 1. Preferred of these active materials are lithium-transition metal complex oxides, such as $LiCoO_2$, $LiNiO_2$, $LiMn_2O_4$, $LiMnO_2$, and $LiV_2O_3$. Binders used in the cathode and the anode include, but are not limited to, polyvinylidene fluoride, polytetrafluoroethylene, EPDM, SBR, NBR, and fluororubber.

The anode is a sheet electrode prepared by applying a slurried mixture of an anode active material and a binder onto a current collector followed by drying. The anode active material includes inorganic substances, such as lithium, lithium alloys, and tin compounds, carbonaceous materials, and electrically conductive polymers. Safe carbonaceous materials capable of intercalating and deintercalating lithium ions are particularly preferred. Such carbonaceous materials include, but are not limited to, graphite, oil coke, coke, oil pitch coke, pitch coke, carbonization products of resins, such as phenolic resins and crystalline cellulosic resins, partial carbonization products of pitch, oil pitch or the resins, furnace black, acetylene black, pitch-based carbon fiber, and PAN-based carbon fiber.

The conductive agent used in the cathode include, but are not limited to, graphite powder, carbon black (e.g., acetylene black), and amorphous carbon powder (e.g., needle coke). The active material mixture is slurried usually with an organic solvent having dissolved therein a binder. Useful organic solvents include, but are not limited to, N-methylpyrrolidone, dimethylformamide, dimethylacetamide, methyl ethyl ketone, cyclohexanone, methyl acetate, methyl acrylate, diethyltriamine, N,N-dimethylaminopropylamine, ethylene oxide, and tetrahydrofuran. The active material mixture may be slurried with a latex of SBR, etc. in water containing a dispersant, a thickener, etc.

The current collector for the anode includes copper, nickel, stainless steel, and nickel-plated steel; and that for the cathode includes aluminum, stainless steel, and nickel-plated steel.

A separator is disposed between the cathode and the anode. Generally employed microporous polymer films are used as a separator with no particular limitation. Useful polymers include polyethylene, polypropylene, polyvinylidene fluoride, polyvinylidene chloride, polyacrylonitrile, polyacrylamide, polytetrafluoroethylene, polysulfone, polyether sulfone, polycarbonate, polyamide, polyimide, polyethers (e.g., polyethylene oxide and polypropylene oxide), cellulosic polymers (e.g., carboxymethyl cellulose and hydroxypropyl cellulose), poly(meth)acrylic acid or poly(meth)acrylic ester polymers and their derivatives, copolymers comprising these polymer units, and mixtures thereof. The separator may be a single film or a laminate film composed of two or more of these polymer films. The separator film can contain various additives in appropriate amounts with no particular limitations. Of the above-described porous films, films of polyethylene, polypropylene, polyvinylidene fluoride or polysulfone are preferably used in the nonaqueous secondary battery of the present invention.

The polymer film is made microporous for use as a separator so that the electrolytic solution may penetrate to let ions permeate. Methods of making a porous polymer film include a phase separation method and a stretching method, which are of choice according to the material. The phase separation method comprises making a solution of a polymer in a solvent into a film while inducing micro phase separation and removing the solvent by extraction. The stretching method comprises extruding a molten polymer into a film at a high drawdown, heat treating the extruded film to uniaxially orientate the crystals, and stretching the film to form pores among the crystals. The phase separation method is fit for polyethylene or polyvinylidene fluoride which are preferably used in the present invention.

The electrode active material mixture, the electrolytic solution, and the separator which are used in the nonaqueous secondary battery of the present invention can contain a phenolic antioxidant, a phosphorus antioxidant, a thioether antioxidant, and a hindered amine light stabilizer to improve safety.

The phenolic antioxidant includes 1,6-hexamethylenebis[(3-t-butyl-5-methyl-4-hydroxyphenyl)propionamide], 4,4'-thiobis(6-t-butyl-m-cresol), 4,4'-butylidenebis(6-t-butyl-m-cresol), 1,1,3-tris(2-methyl-4-hydroxy-5-t-butylphenyl)butane, 1,3,5-tris(2,6-dimethyl-3-hydroxy-4-t-butylbenzyl)isocyanurate, 1,3,5-tris(3,5-di-t-butyl-4-hydroxybenzyl)isocyanurate, 1,3,5-tris(3,5-di-t-butyl-4-hydroxybenzyl)-2,4,6-trimethylbenzene, tetrakis[methyl 3-(3,5-di-t-butyl-4-hydroxyphenyl)propionate]methane, thiodiethylene glycol bis[(3,5-di-t-butyl-4-hydroxyphenyl)propionate], 1,6-hexamethylenebis(3,5-di-t-butyl-4-hydroxyphenyl propionate), bis[3,3-bis(4-hydroxy-3-t-butylphenyl)butyric acid]glycol ester, bis[2-t-butyl-4-methyl-6-(2-hydroxy-3-t-butyl-5-methylbenzyl)phenyl]terephthalate, 1,3,5-tris[(3,5-di-t-butyl-4-hydroxyphenyl)propionyloxyethyl]isocyanurate, 3,9-bis[1,1-dimethyl-2-{(3-t-butyl-4-hydroxy-5-methylphenyl)propionyloxy}ethyl]-2,4,8,10-tetraoxaspiro[5,5]undecane, and triethylene glycol bis[(3-t-butyl-4-hydroxy-5-methylphenyl)propionate]. The phenolic antioxidant is usually used in an amount of 0.01 to 10 parts, preferably 0.05 to 5 parts, by weight per 100 parts by weight of the electrode active material mixture.

The phosphorus antioxidant includes tris(nonylphenyl) phosphite, tris[2-t-butyl-4-(3-t-butyl-4-hydroxy-5-methylphenylthio)-5-methylphenyl]phosphite, tridecyl phosphite, octyldiphenyl phosphite, didecylmonophenyl phosphite, di(tridecyl)pentaerythritol diphosphite, di(nonylphenyl)pentaerythritol diphosphite, bis(2,4-di-t-butylphenyl)pentaerythritol diphosphite, bis(2,6-di-t-butyl-4-methylphenyl)pentaerythritol diphosphite, bis(2,4,6-tri-t-butylphenyl)pentaerythritol diphosphite, bis(2,4-dicumylphenyl)pentaerythritol diphosphite, tetra(tridecyl)isopropylidenediphenol diphosphite, tetra(tridecyl)-4,4'-n-butylidenebis(2-t-butyl-5-methylphenol)diphosphite, hexa(tridecyl)-1,1,3-tris(2-methyl-4-hydroxy-5-t-butylphenyl)butane triphosphite, tetrakis(2,4-di-t-butylphenyl)biphenylene diphosphonite, 9,10-dihydro-9-oxa-10-phosphaphenanthrene-10-oxide, 2,2'-methylenebis(4,6-t-butylphenyl)-2-ethylhexyl phosphite, 2,2'-methylenebis(4,6-t-butylphenyl)-octadecyl phosphite, 2,2'-ethylidenebis(4,6-di-t-butylphenyl)fluorophosphite, tris(2-[(2,4,8,10-tetrakis-t-butyldibenzo[d,f][1,3,2]dioxoaphosphepin-6-yl)oxy]ethyl)amine, (2-ethyl-2-butylpropylene glycol)(2,4,6-tri-t-butylphenol)phosphite.

The thioether antioxidant includes dialkyl thiodipropionates, such as dilauryl thiodipropionate, dimyristyl thiodipropionate, and distearyl thiodipropionate, and pentaerythritol tetra($\beta$-alkylmercaptopropionate)s.

The hindered amine light stabilizer includes 2,2,6,6-tetramethyl-4-piperidyl stearate, 1,2,2,6,6-pentamethyl-4-piperidyl stearate, 2,2,6,6-tetramethyl-4-piperidyl benzoate, bis(2,2,6,6-tetramethyl-4-piperidyl)sebacate, tetrakis(2,2,6,6-tetramethyl-4-piperidyl) 1,2,3,4-butanetetracarboxylate, tetrakis(1,2,2,6,6-pentamethyl-4-piperidyl) 1,2,3,4-butanetetracarboxylate, bis(2,2,6,6-tetramethyl-4-piperidyl) di(tridecyl) 1,2,3,4-butanetetracarboxylate, bis(1,2,2,6,6-pentamethyl-4-piperidyl)di(tridecyl) 1,2,3,4-butanetetracarboxylate, bis(1,2,2,4,4-pentamethyl-4-piperidyl) 2-butyl-2-(3,5-di-t-butyl-4-hydroxybenzyl)malonate, a 1-(2-hydroxyethyl)-2,2,6,6-tetramethyl-4-piperidinol/diethyl succinate polycondensate, a 1,6-bis(2,2,6,6-tetramethyl-4-piperidyl-amino)hexane/2,4-dichloro-6-morpholino-s-triazine polycondensate, a 1,6-bis(2,2,6,6-tetra-methyl-4-piperidylamino)hexane/2,4-dichloro-6-t-octylamino-s-triazine poly-condensate, 1,5,8,12-tetrakis[2,4-bis(N-butyl-N-(2,2,6,6-tetramethyl-4-piperidyl)amino)-s-triazin-6-yl]-1,5,8,12-tetraazadodecane, 1,5,8,12-tetrakis[2,4-bis(N-butyl-N-(1,2,2,6,6-pentamethyl-4-piperidyl)amino)-s-triazin-6-yl]-1,5,8,12-tetra-azadodecane, 1,6,11-tris[2,4-bis(N-butyl-N-(2,2,6,6-tetramethyl-4-piperidyl)amino)-s-triazin-6-yl]amino-undecane, and 1,6,11-tris[2,4-bis(N-butyl-N-(1,2,2,6,6-pentamethyl-4-piperidyl)amino)-s-triazin-6-yl]aminoundecane.

The nonaqueous secondary battery according to the present invention is not particularly restricted in shape and can have various shapes, such as a coin shape, a cylindrical shape, an angular shape, and the like. An example of a coin type nonaqueous secondary battery and an example of a cylindrical nonaqueous secondary battery, to which the present invention is applicable, are shown in FIGS. 1 to 3.

Figure 1:
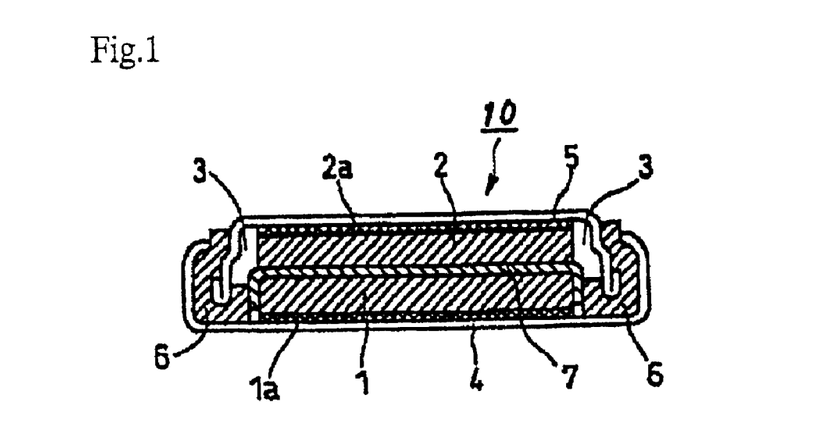
FIG. 1 is a schematic cross-section of a coin type nonaqueous secondary battery.
Figure 2:
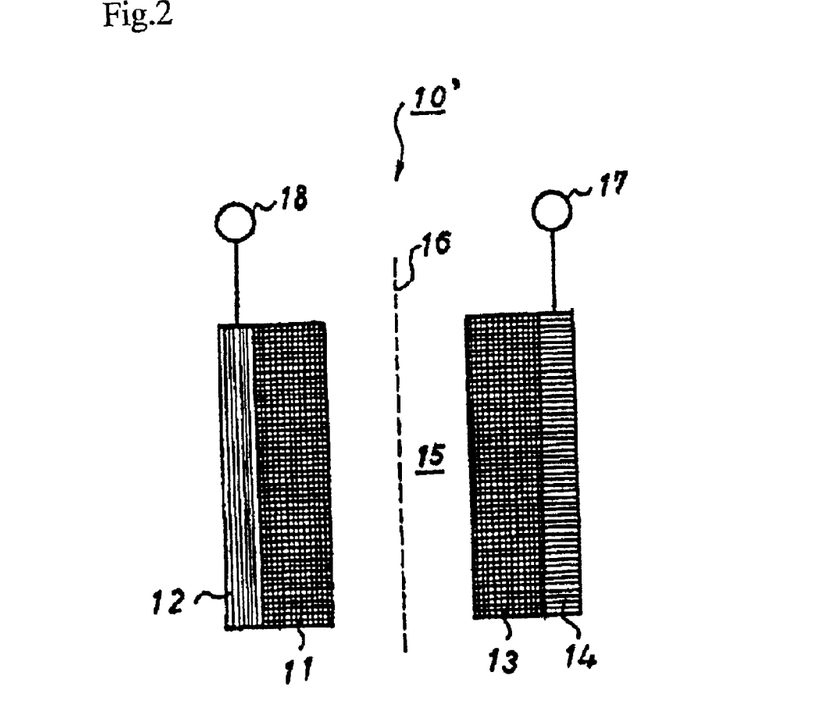
FIG. 2 is a schematic illustration showing the basic constitution of a cylindrical nonaqueous secondary battery.

The coin type nonaqueous secondary battery 10 shown in FIG. 1 comprises a cathode 1 capable of deintercalating lithium ions, a cathode current collector 1a, an anode 2 made of a carbonaceous material capable of intercalating and deintercalating the lithium ions released from the cathode 1, an anode current collector 2a, a nonaqueous electrolytic solution 3 according to the present invention, a cathode case 4 made of stainless steel, an anode case 5 made of stainless steel, a gasket 6 made of polypropylene, and a separator 7 made of polyethylene.

Figure 3:
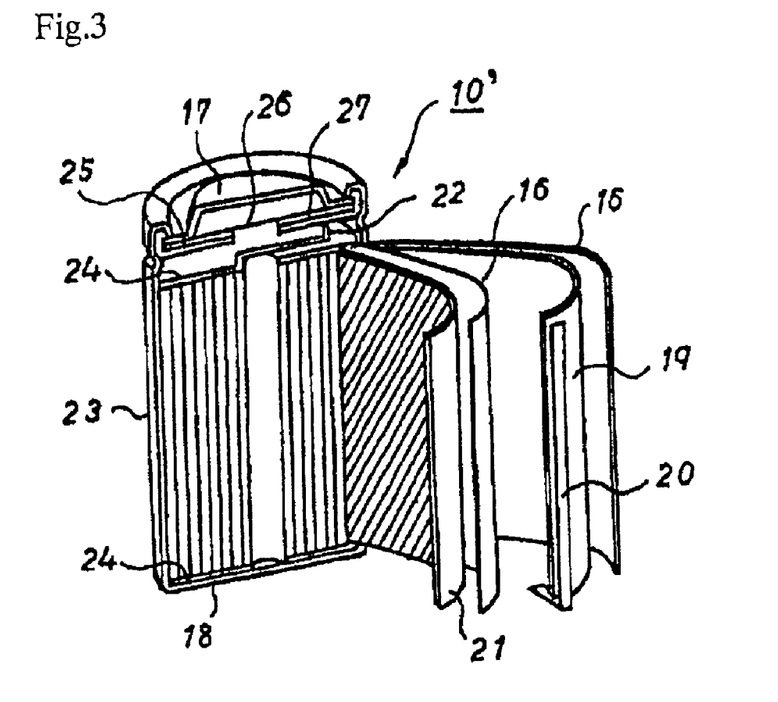
FIG. 3 is a perspective view of a cylindrical nonaqueous secondary battery, in which the inside structure is shown as a cross-sectional view and a partially exploded view.

The cylindrical nonaqueous secondary battery 10' shown in FIG. 3 comprises an anode 11, an anode current collector 12, a cathode 13, a cathode current collector 14, a nonaqueous electrolytic solution 15 according to the present invention, a separator 16, a cathode terminal 17, an anode terminal 18, an anode plate 19, an anode lead 20, a cathode plate 21, a cathode lead 22, a battery case 23, an insulating plate 24, a gasket 25, a safety valve 26, and a PTC element 27.

Although the mechanism of action of the present invention has not been made clear, it is believed that the silicon compound polymerizes and the organotin compound or the organogermanium compound reacts on the electrode surface in the initial stage of charge-discharge cycles to form a film that retains high lithium ion conductivity even in low temperature. Probably because of the stable film, it appears that the progress of side reactions between electrodes and the electrolytic solution with cycles is suppressed as compared with what would be in the absence of these compounds and thereby an increase in internal resistance with cycles can be suppressed. It is also considered that the resistance of the film is small in low temperature and therefore a high discharge capacity is maintained.

The present invention will now be illustrated in greater detail, but it should be understood that the present invention is by no means limited thereto. Unless otherwise noted, all the parts are by weight.

EXAMPLE 1 AND COMPARATIVE EXAMPLE 1

Preparation of Cathode:

Eighty-five parts of $LiNiO_2$ as a cathode active material, 10 parts of acetylene black as a conductive agent, and 5 parts of polyvinylidene fluoride (PVDF) as a binder were mixed to prepare a cathode active material mixture. The mixture was dispersed in N-methyl-2-pyrrolidone (NMP) to make a slurry. The slurry was applied to both sides of a current collector made of aluminum, dried, and pressed to prepare a cathode plate, which was cut to a prescribed size. The active material mixture was scraped off the part of the cathode plate to which a lead tab was to be welded to prepare a cathode in a sheet form.

Preparation of Anode:

A mixture of 92.5 parts of a powdered carbon material and 7.5 parts of PVDF was dispersed in NMP. The resulting slurry was applied to both sides of a current collector made of copper, dried and pressed to prepare an anode electrode, which was cut to a prescribed size. The active material mixture was scraped off the part of the anode plate to which a lead tab was to be welded to prepare an anode in a sheet form.

Preparation of Nonaqueous Electrolytic Solution:

$LiPF_6$ was dissolved in a mixed organic solvent (described later) in a concentration of 1 mol/l, and a test compound shown in Table 1 below was added thereto to prepare a nonaqueous electrolytic solution.

Preparation of Battery:

The cathode and the anode were combined with a 25 μm thick microporous polyethylene film separator interposed therebetween and rolled up into a cylinder. The cylinder was put into a case, with one end of a current collecting lead welded to the lead tab welding part of the cathode or the anode, and the other end bonded to the cathode or anode, respectively. The electrolytic solution was poured into the case and sealed with a cap to prepare a cylindrical nonaqueous lithium secondary battery having a diameter of 18 mm and a height of 65 mm.

Various characteristics of the cylindrical lithium secondary battery thus prepared were measured as follows. The results obtained are shown in Table 1.

1) Initial Discharge Capacity

The battery was subjected to a constant current constant voltage charge at a charging current of 0.25 mA/cm$^2$ up to 4.1 V and then a constant current discharge at a discharging current of 0.33 mA/cm$^2$ to a cut-off voltage of 3.0 V. Then a constant current constant voltage charge at 1.1 mA/cm$^2$ to 4.1 V and a constant current discharge at 1.1 mA/cm$^2$ to 3.0 V were carried out four times. Finally the battery was subjected to a constant current constant voltage charge at 1.1 mA/cm$^2$ to 4.1 V and a constant current discharge at a 0.33 mA/cm$^2$ to 3.0 V. The discharge capacity in the final discharge was taken as an initial battery capacity. The measurement was made in an atmosphere at 20° C.

2) High-temperature Cycle Characteristics Test

The battery was placed in a thermostat set at 60° C. and subjected to 500 charge-discharge cycles by repeating a constant current charge at 2.2 mA/cm$^2$ to 4.1 V and a constant current discharge at 2.2 mA/cm$^2$ to 3V. The atmosphere temperature was returned to 20° C., and the battery was subjected to a constant current constant voltage charge at 1.1 mA/cm$^2$ to 4.1 V and a constant current discharge at 0.33 mA/cm$^2$ to 3.0 V. A ratio of the discharge capacity in the final discharge to the initial battery capacity was taken as a discharge capacity retention (%).

3) Internal Resistance Increase

The battery was subjected to a constant current constant voltage charge at 1.1 mA/cm$^2$ to 3.75 V at 20° C. or −30° C. An AC impedance spectrum was measured on a Solartron 1260 Frequency Response Analyzer in conjunction with a Potentiostat/Galvanostat Solartron 1287 (both supplied by Toyo Corp.) over a frequency range 100 kHz to 0.02 Hz. The real part and the imaginary part of the complex impedance were plotted as abscissa and ordinate, respectively, to prepare a Cole-Cole plot. A circle best fit to the arch of the plot was depicted. The greater value of the two intersections of the circle with the real axis was taken as a resistivity, which was taken as an internal resistance. The measurement was made before and after the cycle test, and an internal resistance increase (%) was obtained from equation:

Internal resistance increase (%)=(resistivity after cycle test/resistivity before cycle test)×100

4) Low-temperature Characteristics

Ratios of discharge capacity and internal resistance at −30° C. to those at 20° C. were calculated as follows.

Discharge capacity ratio (%)=(discharge capacity at −30° C./discharge capacity at 20° C.)×100

Internal Resistance Ratio=Internal Resistance at −30° C./internal Resistance at 20° C.

In Example 1, the electrolytic solution was prepared by dissolving $LiPF_6$ in a mixed solvent of 30 vol % of ethylene carbonate and 70 vol % of diethyl carbonate in a concentration of 1 mol/l, and a test compound shown in Table 1 below was added thereto in an amount shown in Table 1. In Comparative Example 1-1, any test compound was not added. In Comparative Examples 1-2 and 1-3, comparative compound Nos. 36 and 37 shown below were used, respectively, as a test compound. The initial battery capacity of the battery of Comparative Example 1-1 taken as a standard, all the other batteries were equal or superior to the battery of Comparative Example 1-1 in initial battery capacity.

TABLE 1

| | Compound No. | Amount (vol %) | Low-Temperature Characteristics −30° C. | | Characteristics after 500 Cycles 20° C. | |
|---|---|---|---|---|---|---|
| | | | Discharge Capacity Ratio (%) | Internal Resistance Ratio | Discharge Capacity Retention (%) | Internal Resistance Increase (%) |
| Ex. 1-1 | 1 | 0.1 | 78 | 12.6 | 88.0 | 135 |
| Ex. 1-2 | 1 | 0.3 | 80 | 11.7 | 88.5 | 133 |
| Ex. 1-3 | 1 | 0.5 | 81 | 11.5 | 89.7 | 130 |
| Ex. 1-4 | 1 | 1.0 | 80 | 11.6 | 89.5 | 130 |
| Ex. 1-5 | 1 | 1.5 | 76 | 12.4 | 89.3 | 131 |
| Ex. 1-6 | 1 | 2.0 | 75 | 13.5 | 89.1 | 131 |
| Ex. 1-7 | 2 | 0.5 | 78 | 13.1 | 86.7 | 138 |
| Ex. 1-8 | 3 | 0.5 | 77 | 13.2 | 87.2 | 136 |
| Ex. 1-9 | 4 | 0.5 | 80 | 11.7 | 88.6 | 133 |
| Ex. 1-10 | 5 | 0.5 | 75 | 15.1 | 84.2 | 142 |
| Ex. 1-11 | 6 | 0.5 | 74 | 15.2 | 87.5 | 134 |
| Ex. 1-12 | 7 | 0.5 | 78 | 13.0 | 88.0 | 135 |
| Ex. 1-13 | 8 | 0.5 | 75 | 15.0 | 87.7 | 140 |
| Ex. 1-14 | 9 | 0.5 | 76 | 14.9 | 88.5 | 133 |
| Ex. 1-15 | 10 | 0.5 | 75 | 14.8 | 85.5 | 140 |
| Ex. 1-16 | 11 | 0.5 | 74 | 14.6 | 85.2 | 140 |
| Ex. 1-17 | 12 | 0.5 | 74 | 14.7 | 87.4 | 137 |
| Ex. 1-18 | 13 | 0.5 | 78 | 13.0 | 87.6 | 139 |
| Ex. 1-19 | 14 | 0.5 | 78 | 13.1 | 87.5 | 134 |
| Ex. 1-20 | 15 | 0.5 | 75 | 14.8 | 84.2 | 142 |
| Ex. 1-21 | 16 | 0.5 | 76 | 14.9 | 85.2 | 140 |
| Ex. 1-22 | 17 | 0.5 | 75 | 14.8 | 86.7 | 138 |
| Ex. 1-23 | 18 | 0.5 | 74 | 14.6 | 87.2 | 136 |
| Ex. 1-24 | 19 | 0.5 | 74 | 14.5 | 87.7 | 140 |
| Ex. 1-25 | 20 | 0.5 | 75 | 14.8 | 87.6 | 139 |
| Ex. 1-26 | 21 | 0.5 | 75 | 14.5 | 87.5 | 134 |
| Ex. 1-27 | 22 | 0.5 | 76 | 14.9 | 87.4 | 135 |
| Ex. 1-28 | 23 | 0.5 | 74 | 14.8 | 86.7 | 138 |
| Ex. 1-29 | 24 | 0.5 | 77 | 13.1 | 88.5 | 133 |
| Ex. 1-30 | 25 | 0.5 | 76 | 13.2 | 88.0 | 135 |
| Ex. 1-31 | 26 | 0.5 | 75 | 15.0 | 84.7 | 141 |
| Comp. Ex. 1-1 | none | — | 58 | 18.1 | 78.5 | 151 |
| Comp. Ex. 1-2 | 36 | 0.5 | 59 | 18.0 | 78.4 | 150 |
| Comp. Ex. 1-3 | 37 | 0.5 | 58 | 18.0 | 78.3 | 151 |

Comparative compound No. 36

Comparative compound No. 37

EXAMPLE 2

LiPF$_6$ was dissolved in a mixed organic solvent of 30 vol % of ethylene carbonate and 70 vol % of diethyl carbonate in a concentration of 1 mol/l, and a test compound shown in Table 2 below was added thereto in the amount shown in Table 2 to prepare a nonaqueous electrolytic solution.

Lithium secondary batteries were fabricated in the same manner as in Example 1. Low-temperature characteristics of the batteries were measured as follows. The results obtained are shown in Table 2. The initial battery capacity of the battery of Comparative Example 2-1 containing no test compound being taken as a standard, all the other batteries were equal or superior to the battery of Comparative Example 2-1 in initial battery capacity.

Measurement of Low-temperature Characteristics:

The discharge capacity and the internal resistance at −30° C. were measured in the same manner as in Example 1 and compared with those of Comparative Example 2-1 containing no test compound.

Discharge capacity ratio (%)=(discharge capacity with test compound added/discharge capacity with no test compound added)×100

Internal resistance ratio (%)=(internal resistance with test compound added/internal resistance with no test compound added)×100

TABLE 2

| | Test Compound | | Low-Temperature Characteristics (−30° C.) | |
|---|---|---|---|---|
| | Kind | Amount (wt %) | Discharge Capacity Ratio (%) | Internal Resistance Ratio (%) |
| Ex. 2–1 | dibutyltin (1-allyloxymethyl)ethylene glycolate | 0.1 | 137 | 74 |
| Ex. 2–2 | dibutyltin (1-allyloxymethyl)ethylene glycolate | 0.3 | 141 | 71 |
| Ex. 2–3 | dibutyltin (1-allyloxymethyl)ethylene glycolate | 0.5 | 147 | 70 |
| Ex. 2–4 | dibutyltin (1-allyloxymethyl)ethylene glycolate | 1.0 | 137 | 75 |
| Ex. 2–5 | dibutyltin (1-allyloxymethyl)ethylene glycolate | 1.5 | 133 | 75 |
| Ex. 2–6 | dibutyltin (1-allyloxymethyl)ethylene glycolate | 2.0 | 131 | 77 |
| Ex. 2–7 | divinyltin (1-allyloxymethyl)ethylene glycolate | 0.5 | 150 | 69 |
| Ex. 2–8 | monooctyltin trimethoxide | 0.5 | 139 | 71 |
| Ex. 2–9 | dibutyltin dipropoxide | 0.5 | 138 | 73 |
| Ex. 2–10 | dibutyltin (1-hexyl)ethylene glycolate | 0.5 | 140 | 70 |
| Ex. 2–11 | dibutyltin (1-butoxymethyl)ethylene glycolate | 0.5 | 139 | 72 |
| Ex. 2–12 | dibutyltin (1,1,3-trimethyl)-1,3-propylene glycolate | 0.5 | 138 | 73 |
| Ex. 2–13 | bisacetylacetonatodibutyltin | 0.5 | 139 | 73 |
| Ex. 2–14 | bis(2,2-dimethyl-3,5-hexanedionato)dibutyltin | 0.5 | 138 | 72 |
| Ex. 2–15 | bisbenzoylacetonato-dibutyltin | 0.5 | 118 | 85 |
| Comp. Ex. 2–1 | none | — | 100 | 100 |
| Comp. Ex. 2–2 | Tin tetramethoxide [$Sn(OCH_3)_4$] | 0.5 | 102 | 93 |

EXAMPLE 3

$LiPF_6$ was dissolved in a mixed organic solvent of 30 vol % of ethylene carbonate, 60 vol % of diethyl carbonate and 10 vol % of triethyl phosphate in a concentration of 1 mol/l, and a test compound shown in Table 3 below was added thereto in an amount of 0.5 vol % to prepare a nonaqueous electrolytic solution.

Lithium secondary batteries were fabricated in the same manner as in Example 1. The discharge capacity retention (%) after 500 cycles and the internal resistance increase (%) after 500 cycles were measured in the same manner as in the high-temperature cycle characteristics test and the internal resistance increase measurement in Example 1. In addition, a flame retardance test was carried out in accordance with the following method. The results obtained are shown in Table 3.

Flame Retardance Test:

A strip of manila paper for a separator 15 mm wide, 320 mm long and 0.04 mm thick was dipped in the electrolytic solution shown in Table 3 and then hung vertically for 3 minutes to drip the excess of the solution. The impregnated manila paper was fixed horizontally on pins of a mount at 25 mm intervals. The mount was put in a metal box of 250 mm×250 mm×500 mm, one end of the strip was lit up with a lighter, and the burnt length was measured. A burnt length shorter than 10 mm was judged "good" as being indicative of self-extinguishing properties of the electrolytic solution, and a burnt length of 10 mm or longer was judged "poor" as indicating that the electrolytic solution had no self-extinguishing properties.

TABLE 3

| | Test Compound | | Characteristics after 500 cycles 20° C. | | |
|---|---|---|---|---|---|
| | No. | Amount (vol %) | Discharge Capacity Retention (%) | Internal Resistance Increase (%) | Flame Retardance |
| Ex. 3-1 | 1 | 0.5 | 83.5 | 139 | good |
| Ex. 3-2 | 2 | 0.5 | 81.7 | 149 | good |
| Ex. 3-3 | 3 | 0.5 | 82.5 | 147 | good |
| Ex. 3-4 | 7 | 0.5 | 82.7 | 148 | good |
| Ex. 3-5 | 9 | 0.5 | 81.7 | 149 | good |
| Ex. 3-6 | 12 | 0.5 | 82.1 | 148 | good |
| Ex. 3-7 | 13 | 0.5 | 83.4 | 142 | good |
| Ex. 3-8 | 14 | 0.5 | 82.1 | 147 | good |
| Ex. 3-9 | 21 | 0.5 | 80.9 | 150 | good |
| Ex. 3-10 | 25 | 0.5 | 81.8 | 149 | good |
| Comp. Ex. 3-1 | none | — | 77.5 | 164 | good |
| Comp. Ex. 3-2 | 37 | 0.5 | 77.4 | 165 | good |

EXAMPLE 4

$LiPF_6$ was dissolved in a mixed organic solvent of 30vol % of ethylene carbonate, 60 vol % of diethyl carbonate and 10 vol % of triethyl phosphate in a concentration of 1 mol/l, and a test compound shown in Table 4 below was added thereto in an amount of 0.5 wt % to prepare a nonaqueous electrolytic solution.

Lithium secondary batteries were fabricated in the same manner as in Example 1. The low-temperature characteristics in terms of discharge capacity ratio (%) and internal resistance ratio (%) were measured in the same manner as in Example 2. In addition, a flame retardance test was carried out in the same manner as in Example 3. The results obtained are shown in Table 4.

TABLE 4

| | Test Compound | Low-Temperature Characteristics (−30° C.) | | Flame Retardance |
|---|---|---|---|---|
| | | Discharge Capacity Ratio (%) | Internal Resistance Ratio (%) | |
| Ex. 4–1 | dibutyltin (1-allyloxymethyl)ethylene glycolate | 142 | 71 | good |
| Ex. 4–2 | monooctyltin trimethoxide | 136 | 74 | good |
| Ex. 4–3 | dibutyltin dipropoxide | 135 | 75 | good |
| Ex. 4–4 | dibutyltin (1-hexyl)ethylene glycolate | 138 | 72 | good |
| Ex. 4–5 | dibutyltin (1-butoxymethyl)ethylene glycolate | 137 | 73 | good |
| Ex. 4–6 | dibutyltin (1,1,3-trimethyl)-1,3-propylene glycolate | 136 | 74 | good |
| Ex. 4–7 | bisacetylacetonato-dibutyltin | 137 | 72 | good |
| Ex. 4–8 | bis(2,2-dimethyl-3,5-hexanedionato)dibutyltin | 134 | 76 | good |
| Ex. 4–9 | bisbenzoylacetonato-dibutyltin | 113 | 86 | good |
| Comp. Ex. 4–1 | none | 100 | 100 | good |
| Comp. Ex. 4–2 | tin tetramethoxide | 101 | 95 | good |

EXAMPLE 5

LiPF$_6$ was dissolved in a mixed organic solvent having the composition shown in Table 5 below in a concentration of 1 mol/l, and compound No. 1 was added thereto as a test compound in an amount of 1.0 vol % to prepare a nonaqueous electrolytic solution.

Lithium secondary batteries were fabricated in the same manner as in Example 1. The low-temperature characteristics in terms of discharge capacity ratio (%) were measured in the same manner as in Example 1. The results obtained are shown in Table 5.

TABLE 5

| | Electrolytic Solution | | | Compound No. | Low-temperature Characteristics (−30° C.) Discharge Capacity Ratio (%) |
|---|---|---|---|---|---|
| | Ethylene Carbonate (vol %) | Diethyl Carbonate (vol %) | Acetic Ester (vol %) | | |
| Ex. 5-1 | 30 | 60 | propyl acetate (10) | 1 | 81 |
| Ex. 5-2 | 30 | 50 | propyl acetate (20) | 1 | 83 |
| Ex. 5-3 | 30 | 40 | propyl acetate (30) | 1 | 84 |
| Ex. 5-4 | 30 | 50 | methyl propionate (20) | 1 | 83 |
| Ex. 5-5 | 30 | 50 | sec-butyl acetate (20) | 1 | 82 |

EXAMPLE 6

LiPF$_6$ was dissolved in a mixed organic solvent having the composition shown in Table 6 below in a concentration of 1 mol/l, and an additive shown in Table 6 below of the amount shown in Table 6 was added. Further, dibutyltin (1-allyloxymethyl)ethylene glycolate was added thereto as a test compound in an amount of 1.0 wt % to prepare a nonaqueous electrolytic solution. In Comparative Example 6-1, neither an additive nor a test compound was added.

Lithium secondary batteries were fabricated in the same manner as in Example 1. The low-temperature characteristics in terms of discharge capacity ratio (%) were measured in the same manner as in Example 2. The results obtained are shown in Table 6.

TABLE 6

| | Electrolytic Solution | | | | Low-temperature Characteristics (−30° C.) |
|---|---|---|---|---|---|
| | Ethylene Carbonate (vol %) | Diethyl Carbonate (vol %) | Additive Kind | Amount (vol %) | Discharge Capacity Ratio (%) |
| Ex. 6-1 | 30 | 60 | propyl acetate | 10 | 159 |
| Ex. 6-2 | 30 | 50 | propyl acetate | 20 | 160 |
| Ex. 6-3 | 30 | 40 | propyl acetate | 30 | 161 |
| Ex. 6-4 | 30 | 50 | methyl propionate | 20 | 160 |
| Ex. 6-5 | 30 | 50 | sec-butyl acetate | 20 | 159 |
| Ex. 6-6 | 30 | 69 | sulfolene | 1 | 142 |
| Ex. 6-7 | 30 | 69 | 1,3-divinyl-1,1,3,3-tetramethyl-disiloxane | 1 | 160 |
| Comp. Ex. 6-1 | 30 | 70 | none | — | 100 |

EXAMPLE 7

$LiPF_6$ was dissolved in a mixed organic solvent of 30 vol % of ethylene carbonate, 40 vol % of ethylmethyl carbonate and 30 vol % of dimethyl carbonate in a concentration of 1 mol/l, and a test compound shown in Table 7 below was added thereto in the amount shown to prepare a nonaqueous electrolytic solution.

Lithium secondary batteries were fabricated in the same manner as in Example 1. The initial low-temperature characteristics in terms of discharge capacity ratio (%) and internal resistance ratio (%) were measured in the same manner as in Example 1. Further, the batteries were subjected to a cycle test at 60° C. in accordance with the following method. The results obtained are shown in Table 7.

Cycle Test:

The battery was placed in a thermostat set at 60° C. and subjected to 500 charge-discharge cycles by repeating a constant current charge at 2.2 mA/cm² to 4.1 V and a constant current discharge at 2.2 mA/cm² to 3V. The atmosphere temperature was returned to 20° C., and the battery was subjected to a constant current constant voltage charge at 1.1 mA/cm² to 4.1 V and a constant current discharge at 0.33 mA/cm² to 3.0 V. A ratio of the discharge capacity in the final discharge to the initial battery capacity was taken as a discharge capacity retention (%). Similarly, a ratio of the internal resistance in the final discharge to the initial internal resistance was taken as an internal resistance increase (%). Further, a discharge capacity after the 500 cycle test was measured at −30° C.

The initial battery capacity of the battery of Comparative Example 7-1 containing no test compound being taken as a standard, all the other batteries were equal or superior to the battery of Comparative Example 7-1 in initial battery capacity.

TABLE 7

| | Compound | | Low-Temperature Characteristics (−30° C.) | | Characteristics after 500 cycles | | |
|---|---|---|---|---|---|---|---|
| | | | | | (20° C.) | | (−30° C.) |
| | Kind | Amount (wt %) | Discharge Capacity Ratio (%) | Internal Resistance Ratio (%) | Discharge Capacity Retention (%) | Internal Resistance Increase (%) | Discharge Capacity Retention (%) |
| Example 7-1 | dibutyltin (1-allyloxymethyl) ethylene glycolate | 0.6 | 120 | 80 | 88 | 150 | 105 |
| Example 7-2 | divinyltin (1-allyloxymethyl) ethylene glycolate | 0.6 | 138 | 71 | 90 | 148 | 123 |
| Example 7-3 | allyltriethyl-germane | 0.6 | 130 | 72 | 83 | 155 | 110 |
| Example 7-4 | dibutylgermanium (1-allyloxymethyl) ethylene glycolate | 0.6 | 115 | 83 | 80 | 160 | 108 |
| Compara. Example 7-1 | none | — | 100 | 100 | 72 | 170 | 88 |

As is apparent from the results in Tables 1 and 3, the nonaqueous secondary batteries comprising the nonaqueous electrolytic solution according to the present invention which contains the unsaturated bond-containing silicon compound suppress a reduction in discharge capacity with cycles. To the contrary, the comparative batteries in which the electrolytic solution contains no silicon compound (Comparative Example 1-or 3-1) undergo a great reduction in discharge capacity with cycles.

It was also ascertained that the use of the unsaturated bond-containing silicon compound according to the present invention improves the low-temperature characteristics in terms of discharge capacity and internal resistance.

The results in Table 5 in view of the results of Example 1-4 (Table 1) verify that use of an ester compound having a low solidifying point as a part of an electrolytic solution solvent improves low-temperature discharge capacity.

It is apparent from the results in Tables 2, 4 and 7 that the nonaqueous secondary batteries comprising the nonaqueous electrolytic solution of the present invention which contains the organotin compound or the organogermanium compound exhibit improved low-temperature characteristics in terms of discharge capacity and internal resistance and excellent cycle characteristics.

Table 6 demonstrates that the electrolytic solutions comprising an ester compound having a low solidifying point, a sulfolene or an unsaturated bond-containing silicon compound in combination with the organotin compound of the present invention further improve the low-temperature discharge capacity as compared with the electrolytic solutions of the present invention which do not contain the ester compound having a low solidifying compound.

Addition of the unsaturated bond-containing silicon compound, the organotin compound or the organogermanium compound according to the present invention to a nonaqueous electrolytic solution provides a nonaqueous secondary battery excellent in cycle characteristics and low-temperature characteristics.

What is claimed is:

1. A nonaqueous electrolytic solution having an electrolyte salt dissolved in an organic solvent, which contains a silicon compound having an unsaturated bond which is represented by formula (I):

(I)

wherein $R_1$, $R_2$, $R_3$, $R_4$, $R_5$, and $R_6$ each represent an alkyl group, an alkoxy group, an alkenyl group, an alkenyloxy group, an alkynyl group, an alkynyloxy group, an aryl group or an aryloxy group, each of which may have an ether bond in the chain thereof; n represents a number of from 0 to 5; when n is 1 to 5, X represents a single bond, an oxygen atom, an alkylene group, an alkylenedioxy group, an alkenylene group, an alkenylenedioxy group, an alkynylene group, an alkynylenedioxy group, an arylene group or an arylenedioxy group; provided that at least one of $R_1$, $R_2$, $R_3$, $R_4$, $R_5$, $R_6$, and X represents a group containing an unsaturated bond, an organotin compound or an organogermanium compound, and wherein said silicon compound is represented by formula (I) wherein X is an ethynylene group.

2. A nonaqueous electrolytic solution having an electrolyte salt dissolved in an organic solvent, which contains a silicon compound having an unsaturated bond which is represented by formula (I):

(I)

wherein $R_1$, $R_2$, $R_3$, $R_4$, $R_5$, and $R_6$ each represent an alkyl group, an alkoxy group, an alkenyl group, an alkenyloxy group, an alkynyl group, an alkynyloxy group, an aryl group or an aryloxy group, each of which may have an ether bond in the chain thereof; n represents a number of from 0 to 5; when n is 1 to 5, X represents a single bond, an oxygen atom, an alkylene group, an alkylenedioxy group, an alkenylene group, an alkenylenedioxy group, an alkynylene group, an alkynylenedioxy group, an arylene group or an arylenedioxy group; provided that at least one of $R_1$, $R_2$, $R_3$, $R_4$, $R_5$, $R_6$, and X represents a group containing an unsaturated bond, an organotin compound or an organogermanium compound, wherein said silicon compound is represented by formula (I) wherein n is 1; one of $R_1$, $R_2$, $R_3$, $R_4$, $R_5$, and $R_6$ is a vinyl group, with all the rest of them representing a methyl group; and X is an oxygen atom.

3. A nonaqueous secondary battery comprising the nonaqueous electrolytic solution according to claim 2.

4. A nonaqueous electrolytic solution having an electrolyte salt dissolved in an organic solvent, which contains a silicon compound having an unsaturated bond which is represented by formula (I):

(I)

wherein $R_1$, $R_2$, $R_3$, $R_4$, $R_5$, and $R_6$ each represent an alkyl group, an alkoxy group, an alkenyl group, an alkenyloxy group, an alkynyl group, an alkynyloxy group, an aryl group or an aryloxy group, each of which may have an ether bond in the chain thereof; n represents a number of from 0 to 5; when n is 1 to 5, X represents a single bond, an oxygen atom, an alkylene group, an alkylenedioxy group, an alkenylene group, an alkenylenedioxy group, an alkynylene group, an alkynylenedioxy group, an arylene group or an arylenedioxy group; provided that at least one of $R_1$, $R_2$, $R_3$, $R_4$, $R_5$, $R_6$, and X represents a group containing an unsaturated bond, an organotin compound or an organogermanium compound, wherein said silicon compound is represented by formula (I) wherein n is 1; $R_1$ and $R_4$ each represent a vinyl group; $R_2$, $R_3$, $R_5$, and $R_6$ each represent a methyl group; and X is an oxygen atom.

5. A nonaqueous secondary battery comprising the nonaqueous electrolytic solution according to claim 4.

6. A nonaqueous electrolytic solution having an electrolyte salt dissolved in an organic solvent, which contains a silicon compound having an unsaturated bond which is represented by formula (I):

(I)

wherein $R_1$, $R_2$, $R_3$, $R_4$, $R_5$, and $R_6$ each represent an alkyl group, an alkoxy group, an alkenyl group, an alkenyloxy group, an alkynyl group, an alkynyloxy group, an aryl group or an aryloxy group, each of which may have an ether bond in the chain thereof; n represents a number of from 0 to 5; when n is 1 to 5, X represents a single bond, an oxygen atom, an alkylene group, an alkylenedioxy group, an alkenylene group, an alkenylenedioxy group, an alkynylene group, an alkynylenedioxy group, an arylene group or an arylenedioxy group; provided that at least one of $R_1$, $R_2$, $R_3$, $R_4$, $R_5$, $R_6$, and X represents a group containing an unsaturated bond, an organotin compound or an organogermanium compound, wherein said organotin compound or said organogermanium compound is represented by formula (II):

(II)

wherein Me represents a tin atom or a germanium atom; $R_1$ represents an alkyl group, an alkenyl group, an aryl group or an alkoxycarbonylalkyl group; when m is 1, $X_1$ and $X_2$ each represent or $X_2$ is nil; when m is 2, $X_2$ represents an alkylene group, an alkenylene group, an alkynylene group, $-Z_3-$, or $-Z_1-R_3-Z_2-$; $Z_1$ and $Z_2$ each represent an oxygen atom, a sulfur atom or —COO—; $Z_3$ represents an oxygen atom or a sulfur atom; $R_2$ represents a substituted or unsubstituted alkyl group, a substituted or unsubstituted alkenyl group or a substituted or unsubstituted aryl group; $R_3$ represents a substituted or unsubstituted straight-chain or branched alkylene group, a substituted or unsubstituted straight-chain or branched alkenylene group or a substituted or unsubstituted arylene group; $R_4$ represents an alkyl group or an aryl group; $R_5$ represents a hydrogen atom, an alkyl group or $R_4CO$—; $R_6$ represents an alkyl group, an aryl group or —O—$R_2$; l represents 1 to 4; m represents 1 or 2; n represents 0 or 1; p represents 0 or 1; q represents 0 or 1; and r represents 0 or 1; provided that when $X_2$ is present, $1+2p+2n+q$ equals 3, and when $X_2$ is absent, $1+2p+2n+q$ equals 4.

7. A nonaqueous secondary battery comprising the nonaqueous electrolytic solution according to claim 6.

8. The nonaqueous electrolytic solution according to claim 6, wherein Me in formula (II) is a tin atom, and l is 1 or 2.

9. A nonaqueous electrolytic solution having an electrolyte salt dissolved in an organic solvent, which contains a silicon compound having an unsaturated bond which is represented by formula (I):

(I)

wherein $R_1$, $R_2$, $R_3$, $R_4$, $R_5$, and $R_6$ each represent an alkyl group, an alkoxy group, an alkenyl group, an alkenyloxy group, an alkynyl group, an alkynyloxy group, an aryl group or an aryloxy group, each of which may have an ether bond in the chain thereof; n represents a number of from 0 to 5; when n is 1 to 5, X represents a single bond, an oxygen atom, an alkylene group, an alkylenedioxy group, an alkenylene group, an alkenylenedioxy group, an alkynylene group, an alkynylenedioxy group, an arylene group or an arylenedioxy group; provided that at least one of $R_1$, $R_2$, $R_3$, $R_4$, $R_5$, $R_6$, and X represents a group containing an unsaturated bond, an organotin compound or an organogermanium compound, wherein said organotin compound is an organotin alkoxide.

10. The nonaqueous electrolytic solution according to claim 9, wherein said organotin alkoxide is an organotin glycolate.

11. The nonaqueous electrolytic solution according to claim 10, wherein said organotin glycolate is an organotin (1-alkoxymethyl)ethylene glycolate.

12. The nonaqueous electrolytic solution according to claim 10, wherein said organotin glycolate is an organotin (1-alkenyloxymethyl)ethylene glycolate.

13. The nonaqueous electrolytic solution according to claim 10, wherein said organotin glycolate is an organotin (1-alkyl)ethylene glycolate.

14. A nonaqueous electrolytic solution having an electrolyte salt dissolved in an organic solvent, which contains a silicon compound having an unsaturated bond which is represented by formula (I):

(I)

wherein $R_1$, $R_2$, $R_3$, $R_4$, $R_5$, and $R_6$ each represent an alkyl group, an alkoxy group, an alkenyl group, an alkenyloxy group, an alkynyl group, an alkynyloxy group, an aryl group or an aryloxy group, each of which may have an ether bond in the chain thereof; n represents a number of from 0 to 5; when n is 1 to 5, X represents a single bond, an oxygen atom, an alkylene group, an alkylenedioxy group, an alkenylene group, an alkenylenedioxy group, an alkynylene group, an alkynylenedioxy group, an arylene group or an arylenedioxy group; provided that at least one of $R_1$, $R_2$, $R_3$, $R_4$, $R_5$, $R_6$, and X represents a group containing an unsaturated bond, an organotin compound or an organogermanium compound, wherein said organotin compound is a (β-diketonato) organotin.

15. The nonaqueous electrolytic solution according to claim 14, wherein said (β-diketonato)organotin is an (alkane-β-dionato)organotin.

16. A nonaqueous electrolytic solution having an electrolyte salt dissolved in an organic solvent, which contains a silicon compound having an unsaturated bond which is represented by formula (I):

(I)

wherein $R_1$, $R_2$, $R_3$, $R_4$, $R_5$, and $R_6$ each represent an alkyl group, an alkoxy group, an alkenyl group, an alkenyloxy group, an alkynyl group, an alkynyloxy group, an aryl group or an aryloxy group, each of which may have an ether bond in the chain thereof; n represents a number of from 0 to 5; when n is 1 to 5, X represents a single bond, an oxygen atom, an alkylene group, an alkylenedioxy group, an alkenylene group, an alkenylenedioxy group, an alkynylene group, an alkynylenedioxy group, an arylene group or an arylenedioxy group; provided that at least one of $R_1$, $R_2$, $R_3$, $R_4$, $R_5$, $R_6$, and X represents a group containing an unsaturated bond, an organotin compound or an organogermanium compound, wherein said nonaqueous electrolytic solution contains said silicon compound in an amount of 0.05 to 5% by volume.

17. A nonaqueous electrolytic solution having an electrolyte salt dissolved in an organic solvent, which contains a silicon compound having an unsaturated bond which is represented by formula (I):

(I)

wherein $R_1$, $R_2$, $R_3$, $R_4$, $R_5$, and $R_6$ each represent an alkyl group, an alkoxy group, an alkenyl group, an alkenyloxy group, an alkynyl group, an alkynyloxy group, an aryl group or an aryloxy group, each of which may have an ether bond in the chain thereof; n represents a number of from 0 to 5; when n is 1 to 5, X represents a single bond, an oxygen atom, an alkylene group, an alkylenedioxy group, an alkenylene group, an alkenylenedioxy group, an alkynylene group, an alkynylenedioxy group, an arylene group or an arylenedioxy group; provided that at least one of $R_1$, $R_2$, $R_3$, $R_4$, $R_5$, $R_6$, and X represents a group containing an unsaturated bond, an organotin compound or an organogermanium compound, wherein said nonaqueous electrolytic solution contains said organotin compound or said organogermanium compound in an amount of 0.05 to 5% by weight.

18. A nonaqueous electrolytic solution having an electrolyte salt dissolved in an organic solvent, which contains a silicon compound having an unsaturated bond which is represented by formula (I):

(I)

wherein $R_1$, $R_2$, $R_3$, $R_4$, $R_5$, and $R_6$ each represent an alkyl group, an alkoxy group, an alkenyl group, an alkenyloxy group, an alkynyl group, an alkynyloxy group, an aryl group or an aryloxy group, each of which may have an ether bond in the chain thereof; n represents a number of 0 or 1; when n is 1, X represents a single bond, an oxygen atom, an alkylene group, an alkylenedioxy group, an alkenylene group, an alkenylenedioxy group, an alkynylene group, an alkynylenedioxy group, an arylene group or an arylenedioxy group; provided that at least one of $R_1$, $R_2$, $R_3$, $R_4$, $R_5$, $R_6$, and X represents a group containing an unsaturated bond.

* * * * *